Patented July 6, 1926.

1,591,653

UNITED STATES PATENT OFFICE.

DAYTON BUMGARDNER, OF CHICAGO, ILLINOIS.

ATTACHING PYROXYLIN MIXTURES TO DENTAL PLATES.

No Drawing. Application filed July 13, 1925. Serial No. 43,427.

This invention relates to all kinds of dental plates provided with artificial teeth and adapted to be worn in the human mouth. Such plates have pink portions simulating portions of the human gums, and such portions are usually made of pink veneering rubber, and are usually vulcanized to the plate at a temperature of about 320° F. Pyroxylin mixtures can be made in better shades of pink than veneering rubber, so that they make a better appearance in the mouth, but they cannot be successfully applied to the plate at the high temperature required to vulcanize the plate, and the color also is altered by the overheating. Pyroxylin mixtures have hitherto been applied to dental plates in solution, and in other ways, but these methods have not been very satisfactory.

According to the present invention the dental plate with the teeth on it is prepared with a space or spaces to receive the pyroxylin mixture, and the said spaces are filled with dental wax in simulation of the human gum on the finished plate. The dental plate is then invested in a flask formed of two separable parts in any approved way. The two parts of the flask are then separated, and the temporary filling of dental wax is removed from the dental plate with hot water or in any other approved manner. The space thus left is then filled with the pyroxylin mixture, which is softened by gentle heat and neatly pressed and fitted into the space. The two parts of the flask are then put together, and the flask is placed in any approved form of steam press or vulcanizer provided with a pressing screw. The flask and its contents are heated by steam to a temperature of about 220° F. which is a temperature which will not injure the pyroxylin mixture but which will soften it sufficiently. The steam is then let out of the press, and the screw is applied to press the heated pyroxylin mixture between the parts of the flask. The pressure causes the pyroxylin mixture to adhere to the dental plate, and makes it fit neatly in the space so that its outer surface has the contour of the human gum previously given to the dental wax.

The flask with its contents is allowed to cool, and then the flask is opened. The dental plate is removed carefully, and the pyroxylin mixture is gone over with suitable tools to remove any undesirable projections, and to give its surface a highly artistic appearance.

What I claim is:

The method of applying pyroxylin mixture to a dental plate which consists in first providing a space in the dental plate with a temporary removable filling to simulate the desired portion of the human gum, said dental plate having the artificial teeth already permanently secured to it, then investing the plate in a flask formed of separable parts, then removing the temporary filling and replacing it with the pyroxylin mixture previously softened by heat, then closing the flask and submitting it to a predetermined additional amount of heat to soften the pyroxylin mixture sufficiently without injuring it, and finally compressing the pyroxylin mixture while soft between the parts of the flask so that it fills the said space and adheres to the dental plate.

DAYTON BUMGARDNER.